3,459,857
PHOSPHO-ACID ESTERS AS FUNGITOXIC AGENTS
Hans Scheinpflug, Leverkusen, Germany, Herbert Ferdinand Jung, Tokyo, Japan, and Gerhard Schrader, Wuppertal-Cronenberg, Germany, assignors to Farbenfabriken Bayer Aktiengesellschaft, Leverkusen, Germany, a corporation of Germany
No Drawing. Filed Oct. 21, 1964, Ser. No. 405,871
Claims priority, application Germany, Nov. 7, 1963,
F 41,214
Int. Cl. A01n 9/36; C07f 9/16, 9/32
U.S. Cl. 424—215                                    19 Claims

ABSTRACT OF THE DISCLOSURE (Alkyl, alkoxy, cycloalkoxy or aryl)-O-alkyl-(thiol- or thionothiol-) phosphoric or phosphonic-S-[alkyl mercapto alkyl or alkylmercapto-α-(carboalkoxy) alkyl] acid esters, which possess fungicidal properties and which may be used to combat fungi, especially in diseases of rice plants.

---

The invention is concerned with fungitoxic agents which consist of thiol- or thionothiol-phosphoric (-phosphonic) acid esters of the general structure

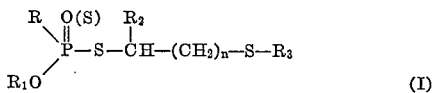

(I)

or contain compounds of this constitution as active agents.

In the above mentioned formula, R stands for a straight-chain or branched alkyl radical, preferably with 1 to 6 carbon atoms, which is linked to the phosphorus atom directly or through an oxygen atom; furthermore, R may stand for a cycloalkyl, aralkyl or aryl radical, whereas $R_1$ stands for a, preferably lower, alkyl group, while $R_2$ represents a hydrogen atom or a lower carbalkoxy group, $R_3$ represents a, preferably lower, alkyl radical, and the index $n$ has the value of zero or one.

It is already known to combat undesired fungus growth by using certain fungitoxic substances. The active fungitoxic agents concerned can be applied to live or dead matter.

Rice diseases caused by phytopathogenic fungi, especially those caused by *Piricularia oryzae,* have hitherto been controlled with the aid of organic mercury compounds, for example, phenyl mercury acetate, or with the antibiotic Blasticidin S or a mixture of both preparations. The first mentioned fungicides have, however, the great disadvantage of a high toxicity towards warmblooded creatures or animals, which may involve considerable risks for humans and useful animals if they are applied carelessly or inappropriately. Furthermore, certain organic mercury compounds, for example the above mentioned phenyl mercury acetate, act phytotoxically on some varieties of rice. In addition, although the organic mercury derivatives as well as the antibiotic Blasticidin S are distinguished by a good curative effect, both of them have, on the other hand, only a rather weak protective activity.

Among commercially available fungicides, for example N - trichloromethyl - thiotetrahydrophthalimide, the metal salts of ethylene-bis-dithio-carbamic acid or tetramethyl-thiuram disulfide, no active agent or compound has yet been disclosed whose effect on fungi causing diseases of rice is sufficient for practical use. For this reason, the main fungicidal preparations which are commercially available have hardly been used in practice for combating rice diseases caused by phytopathogenic fungi.

It is an object of the present invention to overcome the foregoing drawbacks and to provide fungitoxic agents, and more especially thio-phospho acid esters used in compositions and preparations for applying to fungi and their habitat for protective and curative action against such fungi.

It is a further object of the invention to provide methods of using certain known compounds in a new way for crop control purposes.

It is a further object of the invention to provide new fungitoxic preparations, including a thio-phospho acid ester of a particular type, as noted more fully hereinbelow, in admixture with a carrier vehicle.

It is a still further object of the invention to provide a fungitoxic preparation in which the active ingredient or compound is used with a dispersible carrier vehicle, such as a finely divided solid or a liquid, preferably with the carrier vehicle being present in a major amount in the mixture with the fungitoxic agent or compound.

It is still another object of the present invention to provide a fungitoxic preparation in which the active ingredient or compound is used with one or more other fungitoxic substances which possess chiefly curative action, optionally together with a dispersible carrier vehicle of the foregoing type, with the instant protective action compound, the other curative action compound and the carrier vehicle being present in various proportional amounts.

Other and further objects of the present invention will become apparent from a study of the within specification and accompanying examples.

It has now been found, in accordance with the present invention, that compounds of the foregoing type surprisingly possess an outstanding fungitoxic effect. Thus, the present invention relates to fungitoxic agents, and more particularly to thio-phospho acid esters used in compositions and preparations for applying to fungi and their habitat for protective action against such fungi, and to methods of using certain known compounds in a new way for crop control purposes. The thiol-phosphoric and thiol-phosphonic acid esters as well as the thionothiol-phosphoric and thionothiol-phosphonic acid esters of the present invention may be used in the form of a fungitoxic preparation comprising a carrier vehicle in admixture with the particular thio-phospho acid ester, which acid ester may have the general formula

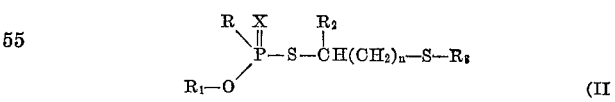

(II)

in which R is selected from the group consisting of alkyl, alkoxy, cycloalkoxy, and aryl radicals, $R_1$ is an alkyl radical, $R_2$ is selected from the group consisting of hydrogen and lower carboalkoxy radicals, $R_3$ is an alkyl radical, X is selected from the group consisting of oxygen and sulfur, and $n$ is a whole number having a value from 0 to 1.

More particularly, the fungitoxic preparation contemplated includes a carrier vehicle in admixture with an amount, sufficient to combat fungi, of a thio-phospho acid ester of the general formula

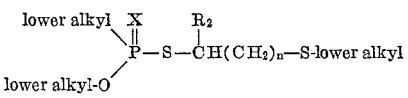
(III)

or of a thio-phospho acid ester of the general formula

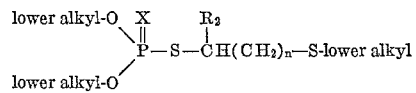
(IV)

or of a thio-phospho acid ester of the general formula

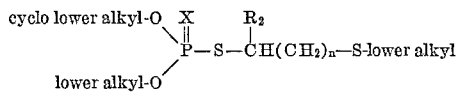
(V)

or of such an acid ester of the general formula

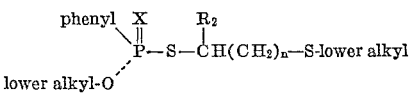
(VI)

in which, in each of the foregoing formulae, $R_2$ is selected from the group consisting of hydrogen and lower carboalkoxy radicals, X is selected from the group consisting of oxygen and sulfur, and $n$ is a whole number having a value from 0 to 1.

The thiol-phosphoric and thiol-phosphonic acid esters as well as the thionothiol-phosphoric and thionothiol-phosphonic acid esters of the present invention possess, in addition to an outstanding fungitoxic effect, only a relatively slight toxicity toward warm-blooded animals and are, therefore, particularly suitable for combating undesired fungus growth. In addition, the substances to be used in accordance with the present invention are distinguished by a favorable compatibility with higher plants, which renders the instant substances particularly suitable as, and enables such substances to be used without difficulty as, plant protection agents against fungus diseases. The compounds to be used according to the present invention can be applied in plant protection for combating phytopathogenic fungi of a great variety of classes, such as for example: *Archimycetes, Phycomycetes, Ascomycetes, Basidomycetes,* and *Fungi imperfecti.*

However, the substances to be used in the invention have proved particularly valuable when applied against a rice disease which is caused by the fungus *Piricularia oryzae*. Such substances show an excellent protective activity in this connection.

Moreover, the substances in question also possess a very good fungitoxic effect against other fungi causing rich diseases, such as *Cochliobolus miyabeanus* and *Corticium sasakii.*

Furthermore, the thiol- or thionothiol-phosphoric (-phosphonic) acid esters to be used according to the invention are also effective against parasitic fungi on plant parts above ground, such as Mycosphaella, Cercospora and Colletotrichum species.

Finally, an activity against fungi causing tracheomycosis can also be observed, for example against Verticillium and Fusarium species.

The active compounds to be used according to the present invention are known from the literature and can be produced, for example, according to the data of German patent specifications Nos. 830,509 and 818,352 and of Belgian patent specification No. 627,458.

Since, as mentioned above, the compounds used according to the invention possess mainly a protective activity they can advantageously be combined with each other, chiefly curative substances. For this purpose there may be considered in the first instance organic mercury compounds, such as phenyl mercury acetate or the antibiotic Blasticidin S. By the addition of the active compounds to be used according to the present invention, the mercury content in these mixed preparations can be considerably lowered without reducing the effect of the agent concerned or having to increase the quantity applied. In this manner, the above mentioned disadvantages of a high toxicity towards warm-blooded animals, which exists if organic mercury compounds are applied by themselves, can be largely eliminated. Finally, by combining preparations of protective and curative activity it is possible to achieve a higher activity as well as an increased activity spectrum without danger to warm-blooded anmals or organisms.

The substances to be used according to the present invention can either be used as such or combined with the solid or liquid extenders or diluents customary for fungicides, i.e. carrier vehicles. Examples of such formulations with carrier vehicles are those with emulsifiable concentrates, spray powders, pastes, soluble powders, dusting agents and granulates. The production of such formulations is carried out in a known manner (compare for example Agricultural Chemicals, March 1960, pp. 35–38). Suitable dispersible liquid carrier vehicles or auxiliaries are mainly: solvents, such as, optionally halogenated, e.g. chlorinated, aromatic hydrocarbons (e.g. xylene, benzene, chlorobenzenes), paraffins (for example petroleum fractions), alcohols (for example methanol, ethanol, butanol), amines (such as ethanolamine or dimethyl formamide) as well as water; where suitable finely divided solid carrier vehicles are, for example: natural or synthetic rock meals or powders, (such as kaolin, chalk, i.e., calcium carbonate, alumina, talcum, highly disperse silicic acid and silicates, e.g. alkali silicates). Also, liquid emulsifiers, such as non-ionic and anionic emulsifiers (for example, polyoxyethylene-fatty acid esters, and polyoxyethylene-fatty alcohol ethers, alkyl- and aryl-sulfonates), especially magnesium stearate, sodium oleate, etc., may be used, as well as dispersing agents, for example lignin, sulfite waste liquors and methyl cellulose.

As mentioned above, the active compounds used according to the instant invention may be present in such formulations in mixture with one another and with other known active substances.

In accordance with the foregoing, it will be realized that in addition to providing fungitoxic preparations or compositions, the present invention provides a method of combating fungi which comprises applying to the fungi and their habitat a fungitoxic amount of a thio-phospho acid ester of the foregoing type. The particular thio-phospho acid ester in question may be applied advantageously in the form of a mixture with a dispersible carrier vehicle, and, for example, such acid ester may be present in the mixture with a major amount of an inert finely divided dispersible solid or inert dispersible liquid as the carrier vehicle. Such acid ester, nevertheless, may be present in the mixture in an over-all amount of from about 0.1 to 95% by weight of the total mixture, as aforesaid, or, if desired, such acid ester may be present in the mixture in a concentration of from about 5 to 0.0005%. In this connection, the present invention contemplates methods of preventing fungus growth on plant crops generally by applying to such plant crops a fungitoxic amount, sufficient to prevent fungus growth, of a thio-phospho acid ester of the type hereinabove defined.

The term alkyl or alkyl radical as used herein, i.e., both in the specification and claims, contemplates substituted and unsubstituted normal and branched as well as saturated and unsaturated carbon chains, such as $C_1$–$C_{12}$ (methyl to dodecyl) alkyl chains, including especially $C_1$–$C_6$ (methyl to hexyl) lower alkyl chains. Among the substituents which may be included thereon are $C_1$–$C_6$ (methyl to hexyl) lower alkyl side chains which may be normal or branched, i.e. substituted with further lower alkyl groups ($C_1$–$C_4$), as well as saturated or unsaturated carbon chains. Representative of the alkyl groups contemplated herein are, for example, methyl, ethyl, propyl, isopropyl, n-butyl, isobutyl, sec.-butyl, tert.-butyl, n-amyl, isoamyl, tert.-amyl, the hexyls, heptyls, octyls, nonyls, decyls, undecyls, dodecyls, etc., i.e., those radicals derived from the paraffin series, including methane, ethane, propane, n-butane, isobutane (2-methyl propane), n-pentane, isopentane (2-methyl butane), tert.-pentane (2,2-dimethyl propane), n-hexane, 2-methyl pentane, 3-methyl pentane, 2,2-dimethyl butane, 2,3-dimethyl butane, etc., n-heptane, 2-methyl hexane, 3-methyl hexane, 2,2-dimethyl pentane, 2,3-dimethyl pentane, 2,4-dimethyl pentane, 3,3-dimethyl pentane, 3-ethyl pentane, 2,2,3-trimethyl butane, etc., octanes, nonanes, decanes, undecanes, dodecanes, etc.; vinyl, α-allyl, β-allyl, γ-allyl, $\Delta^1$-butenyl, $\Delta^2$-butenyl, $\Delta^3$-butenyl, isobutenyl, $\Delta^1$-pentenyl, $\Delta^2$-pentenyl, $\Delta^1$-hexenyl, $\Delta^2$-hexenyl, $\Delta^3$-hexenyl, etc., the heptenyls, octenyls, nonenyls, decenyls, undecenyls, dodecenyls, etc., i.e., those radicals derived from the ethylene series, including ethylene, propylene, butene-1, butene-2, isobutylene (2-methyl propene), pentene-1 (n-amylene), pentene-2 (isoamylene), $\Delta^1$-hexylene (n-hexylene), $\Delta^2$-hexylene, $\Delta^3$-hexylene, etc., heptenes, octenes nonenes, decenes, undecenes, dodecenes, etc., and the like.

The term alkoxy or alkoxy radical as used herein, i.e. both in the specification and claims, contemplates substituted and unsubstituted normal and branched as well as saturated and unsaturated carbon chains, having a terminal oxygen linking atom, such as $C_1$–$C_{12}$ oxy (methoxy to dodecyloxy) alkoxy chains, including especially $C_1$–$C_6$ oxy (methoxy to hexyloxy) lower alkoxy chains. Among the substituents which may be included thereon are $C_1$–$C_6$ (methyl to hexyl) lower alkyl side chains which may be normal or branched, i.e., substituted with further lower alkyl groups ($C_1$–$C_4$) as well as saturated or unsaturated carbon chains. Representative of the alkoxy groups contemplated herein are, for example, methoxy, ethoxy, propoxy, isopropoxy, n-butoxy, isobutoxy, sec.-butoxy, tert.-butoxy, n-amyloxy, iso-amyloxy, tert.-amyloxy, the hexyloxys, heptyl-oxys, octyloxys, nonyloxys, decyloxys, undecyloxys, dodecyloxys, etc., i.e., those radicals derived from the paraffin series, but having a terminal oxygen linking atom, the radicals being particularly derived from the paraffin hydrocarbons, methane, ethane, propane, n-butane, isobutane (2-methyl propane), n-pentane, isopentane (2-methyl butane), tert.-pentane (2,2-dimethyl propane), n-hexane, 2-methyl pentane, 3-methyl pentane, 2,2-dimethyl butane, 2,3-dimethyl butane, etc., n-heptane, 2-methyl hexane, 3-methyl hexane, 2,2-dimethyl pentane, 2,3-dimethyl pentane, 2,4-dimethyl pentane, 3,3-dimethyl pentane, 3-ethyl pentane, 2,2,3-trimethyl butane, etc., octanes, nonanes, decanes, undecanes, dodecanes, etc.; vinyl, α-allyl, β-allyl, γ-allyl, $\Delta^1$-butenyl, $\Delta^2$-butenyl, $\Delta^3$-butenyl, isobutenyl, $\Delta^1$-pentenyl, $\Delta^2$-pentenyl, $\Delta^1$-hexenyl, $\Delta^2$-hexenyl, $\Delta^3$-hexenyl, etc., the heptenyls, octenyls, nonenyls, decenyls, undecenyls, dodecenyls, etc., i.e., those radicals derived from the ethylene series, including ethylene, propylene, butene-1, butene-2, isobutylene (2-methyl propene), pentene-1, (n-amylene), pentene-2 (isoamylene), $\Delta^1$-hexylene (n-hexylene), $\Delta^2$-hexylene, $\Delta^3$-hexylene, etc., heptenes, octenes, nonenes, decenes, undecenes, dodecenes, etc., and the like.

The term cycloalkoxy or cycloalkoxy radical as used herein, i.e., both in the specification and claims, contemplates substituted and unsubstituted as well as saturated and partially unsaturated aliphatic cyclic carbon chains, such as $C_3$–$C_8$ (cyclopentyl to cyclooctyl), cycloalkyl chains, especially cyclo lower radicals ($C_3$–$C_6$), in which a ring hydrogen atom is replaced by a linking oxygen atom, which linking oxygen atom is thus attached to a ring carbon atom of the cyclic moiety. Among the substituents which may be included on the ring are $C_1$–$C_6$ (methyl to hexyl) lower alkyl chains which may be normal or branched, i.e., substituted with further lower alkyl groups ($C_1$–$C_4$), as well as saturated or unsaturated carbon chains. Representatives of the cycloalkoxy groups contemplated herein are, for example, cyclopropxy, cyclobutoxy, cyclopentoxy, cyclohexyloxy, cycloheptyloxy, cyclooctoyloxy, cyclopropenyloxy, cyclobutenyloxy, ($\Delta^1$-tetramethylenyloxy), cyclopentenyloxy, cyclohexenyloxy, cycloheptenyloxy, cyclooctenyloxy, cyclobutylenyloxy ($\Delta^{1,3}$-tetramethylenyloxy), cyclopentadienyloxy ($\Delta^{1,3}$-pentamethylenyloxy), cyclohexadienyloxy (including $\Delta^{3,5}$-cyclohexadienyloxy, $\Delta^{2(4)5}$-cyclohexadienyloxy, $\Delta^{2,5}$-cyclohexadienyloxy), cycloheptadienyloxy, cyclooctadienyloxy, the corresponding methyl, ethyl, propyl, butyl, etc., vinyl, allyl, butenyl substituted cycloalkoxy radicals, such as methyl cyclopentyloxy, 1,2-dimethyl cyclopentyloxy, 1,3-dimethyl cyclopentyloxy, propyl cyclopentyloxy, ethyl cyclohexyloxy, butyl cyclohexyloxy, 1,2,4-trimethyl cyclohexyloxy, etc., vinyl cyclohexyloxy, allyl cyclohexyloxy, butenyl cyclohexyloxy, etc.

The term lower carboalkyoxy or lower carboalkoxy radical as used herein, i.e., both in the specification and claims, contemplates substituted and unsubstituted normal and branched as well as saturated and unsaturated alkoxy chains connected with a carbo group (=C=O), such as $C_1$–$C_6$ lower alkoxy chains (i.e. methoxy to hexyloxy). Among the substituents which may be included on the lower alkoxy moiety are $C_1$–$C_4$ (methyl to butyl) lower alkyl side chains which may be normal or branched, i.e., substituted with further lower alkyl ($C_1$–$C_4$) groups, as well as saturated or unsaturated carbon chains. Representative of the lower alkoxy groups contemplated in linkage with the carbo group (=C=O) are, for example, methoxy, ethoxy, propoxy, isopropoxy, n-butoxy, isobutoxy, sec.-butoxy, tert.-butoxy, n-amyloxy, isoamyloxy, tert.-amyloxy, and the hexyloxies, etc., i.e., those radicals derived from the paraffin series, but including a terminal oxygen linking atom, such as those derived from methane, ethane, propane, n-butane, isobutane, (2-methyl propane), n-pentane, isopentane, (2-methyl butane), tert.-butane, (2,2-dimethyl propane), n-hexane, 2-methyl pentane, 3-methyl pentane, 2,2-dimethyl butane, 2,3-dimethyl butane, etc.; vinyl, α-allyl, β-allyl, γ-allyl, $\Delta^1$-butenyl, $\Delta^2$-butenyl, $\Delta^3$-butenyl, iso-butenyl, $\Delta^1$-pentenyl, $\Delta^2$-pentenyl, $\Delta^1$-hexenyl, $\Delta^2$-hexenyl, $\Delta^3$-hexenyl, etc., i.e., those radicals derived from the ethylene series, but including a terminal oxygen linking atom, such as those derived from ethylene, propylene, butene-1, butene-2, iso-butylene (2-methyl propane), butene-1 (n-amylene), pentene-2 (iso-amylene), $\Delta^1$-hexylene (n-hexylene), $\Delta^2$-hexylene, $\Delta^3$-hexylene, etc., and the like.

The term aryl or aryl radical as used herein, i.e., both in the specification and claims, contemplates substituted as well as unsubstituted aromatic radicals, especially mononuclear and dinuclear aryl radicals, such as phenyl and naphthyl radicals including lower alkyl ($C_1$–$C_6$) substituted aryl, i.e. those radicals in which the replaceable hydrogen atom is located on a carbon atom of the aryl ring nucleus. Among the substituents which may be included on the ring nucleus are $C_1$–$C_6$ (methyl to hexyl) lower alkyl chains which may be normal or branched, i.e., substituted with further lower alkyl groups ($C_1$–$C_4$), as well as saturated or unsaturated carbon chains, and halo-, i.e., chloro-, bromo-, iodo-, and fluoro-, alkoxy, especially $C_1$–$C_6$ lower alkoxy, and nitro groups. Representative of the aryl groups contemplated herein are, for example, phenyl, methylphenyl (tolyl), ethylphenyl, n-propylphenyl, isopropylphenyl (cumenyl), n-butylphenyl, isobutylphenyl, sec. butyl-phenyl, tert. butylphenyl, etc., and the corresponding methyl-, ethyl-, propyl-, butyl-, etc. naphthyl radicals, vinyl phenyl, vinyl naphthyl, allylphenyl, etc., as well as the di- and tri-lower alkyl substituted aryl radicals, etc., as well as the corresponding halo-, alkoxy, and nitro-substituted radicals of the foregoing, such as chloro-, bromo-, iodo- and fluoro-phenyl and/or naphthyl radicals, methoxy-, ethoxy-, propoxy-phenyl and/or naphthyl radicals, and nitro-phenyl and/or nitro-naphthyl radicals; etc.

The term lower alkyl as used herein, i.e., both in the specification and claims and especially in the structural formulae, contemplates linear and branched $C_1$–$C_6$ alkyl chains, such as methyl, ethyl, n-propyl, isopropyl, n-butyl, isobutyl, sec.-butyl, tert.-butyl, n-amyl, iso-amyl, n-hexyl, etc.

The term cyclolower alkyl and/or lower cycloalkyl as used herein, i.e., both in the specification and claims, and especially in the structural formulae, contemplates substituted and unsubstituted alicyclic $C_3$–$C_6$ saturated rings, including lower alkyl ($C_1$–$C_4$) substituted saturated rings, such as cyclopropyl, cyclobutyl, cyclopentyl, cyclohexyl, methyl cyclohexyl, dimethyl cyclohexyl, tri-methyl cyclohexyl, ethyl cyclohexyl, diethyl cyclohexyl, n-propyl cyclohexyl, isopropyl cyclohexyl, n-butyl cyclohexyl, isobutyl cyclohexyl, sec.-butyl cyclohexyl, tert.-butyl cyclohexyl, etc.

The term phenyl as used herein, i.e., both in the specification and claims and especially in the structural formulae, contemplates both substituted and unsubstituted phenyl radicals, including lower alkyl substituted phenyl, i.e., linear or branched $C_1$–$C_6$ alkyl substituted phenyls, such as the phenyl radical ($C_6$—$H_5$—), methyl phenyl, dimethyl phenyl, trimethyl phenyl, ethyl phenyl, n-propyl phenyl, iso-propyl phenyl, n-butyl phenyl, isobutyl phenyl, sec.-butyl phenyl, tert.-butyl phenyl, n-amyl phenyl, iso-amyl phenyl, n-hexyl phenyl, the corresponding di- and tri-substituted $C_2$–$C_6$ lower alkyl substituted phenyls, etc.

In particular, in the foregoing formulae R may be selected from the group consisting of methyl, methoxy, 1,2,2-trimethyl propoxy, cyclohexyloxy, and phenyl, $R_1$ may be selected from the group consisting of methyl, ethyl, and 1,2,2-trimethyl propyl, $R_2$ may be hydrogen and carbo-ethoxy, and $R_3$ may be ethyl. Compounds herein having such substituents have been found to be favorably effective as fungitoxic agents, especially when applied in admixture with a carrier vehicle, even in slight concentrations of from 5 to 0.0005%, such as applying the same by spraying techniques onto plant crops infested with fungi, or more particularly onto plant crops not yet infested whereby a protective effect will be markedly observed.

The following examples are given for the purpose of illustrating the present invention.

EXAMPLE 1

Piricularia test (liquid preparation of active compound)

A liquid preparation of the active compound having the following composition: 1 part by weight of acetone (solvent), 0.05 part by weight of sodium oleate (dispersing agent), 0.2 part by weight of gelatin, and 98.75 parts by weight of water, is produced in the following manner:

The quantity of active compound required for the desired concentration in the spray liquid preparation or composition is mixed with the stated quantity of solvent and the concentrate thus obtained is diluted with the stated proportion of water which contains the mentioned additive and the dispersing agent.

Thirty rice plants, which are about 14 days old, are sprayed with the spray liquid thus produced until dripping wet. The plants then remain in a greenhouse at temperatures of 22 to 24° C. and at a relative atmospheric humidity of about 70%, until dry. After this they are inoculated with an aqueous suspension of 100,000 to 200,000 spores/ml. of *Piricularia oryzae* and placed in a room at a temperature of 24–26° C. and at a relative atmospheric humidity of 100%.

Five days after inoculation, the infestation of all the leaves of the treated plants which were present at the time of inoculation is determined as a percentage of the untreated but also inoculated control plants. 0% means that no infestation occurred and 100% means that the infestation is exactly the same as that of the control plants.

The active compounds, their concentrations and the test results obtained can be seen from the following Table 1.

TABLE 1.—PIRICULARIA TEST
Liquid Preparation of Active Compound

| No. | Active Compound | Infestation in percent of that of untreated control at a concentration of active compound of— | |
|---|---|---|---|
| | | 0.05% | 0.01% |
| (1) | $C_2H_2O$-P(=S)(-S-CH(COOC_2H_5)-CH_2-SC_2H_5)$ attached to phenyl | 0 | 25 |
| (2) | phenyl-O-P(=O)(OCH_3)-S-CH_2-SC_2H_5 | 0 | |
| (3) | phenyl-O-P(=O)(OC_2H_5)-S-CH_2-SC_2H_5 | 0 | 23 |
| (4) | phenyl-O-P(=O)(OC_2H_5)-S-CH_2-CH_2-SC_2H_5 | 7 | 12 |
| (5) | ($C_2H_5O$)(CH_3)P(=S)-S-CH(COOC_2H_5)-CH_2-SC_2H_5 | 0 | 19 |
| (6) | ((CH_3)_3C)(CH_3)CH-O-P(=O)(OC_2H_5)-S-CH_2-CH_2-SC_2H_5 | 1 | 50 |

EXAMPLE 2

Piricularia test (solid preparation of active compound)

A solid preparation of the active compound, which contains 10 parts by weight of acetone (solvent) and 100 parts by weight of a dust base consisting of 95.5% of calcium carbonate, 4.0% of silicic acid and 0.5% of magnesium stearate is prepared in the following manner:

The quantity of active substance required for the desired concentration of the active compound in the dusting agent is mixed with the above mentioned proportion of solvent and the concentrate thus obtained is triturated in a mortar with the above mentioned amount of dust base until the solvent has evaporated.

Thirty rice plants, which are about 14 days old, are dusted with the dusting agent thus prepared; they are then inoculated with an aqueous suspension of 100,000 to 200,000 spores/ml. of *Piricularia oryzae* and placed in a room at a temperature of 24–26° C. and at a relative atmospheric humidity of 100%.

Five days after inoculation, the infestation of all the leaves of the treated plants which were present at the time of inoculation is determined as a percentage of the untreated but also inoculated control plants. 0% means that no infestation occurred and 100% means that the infestation is exactly the same as that of the control plants.

The active compounds, their concentrations and the experimental results obtained can be seen in the following Table 2.

EXAMPLE 3

Mycelium growth test

Nutrient medium: Parts by weight
- Agar-agar powder _____ 20
- Extract of malt _____ 30
- Distilled water _____ 950

Ratio of solvent to nutrient medium:
- Acetone _____ 2
- Agar nutrient medium _____ 100

The amount of active compound required for the desired concentration in the nutrient medium, is mixed with the stated amount of solvent. The concentrate obtained is thoroughly mixed, in the stated ratio, with the liquid nutrient medium, the temperature of which is about 42° C., and then poured into petri dishes of 9 cm. diameter. Control dishes without the active compound are also provided.

When the nutrient medium has cooled and solidified, the dishes are inoculated with the fungi specified in the table and incubated at about 21° C.

Evaluation is carried out after 4 to 10 days, dependent upon the rate of growth of the fungi. For evaluation, the radial growth of the mycelium on the treated nutrient media is compared with the growth on the control media.

The evaluation of the mycelium growth is made as follows:

TABLE 2.—PIRICULARIA TEST
Solid Preparation of Active Compound

| No. | Active Compound | Infestation in percent of that of untreated control at a concentration of active compound of— | |
|---|---|---|---|
| | | 0.1% | 0.05% |
| (1) | $C_2H_5O\underset{}{\overset{S}{\|}}P(\text{–}C_6H_5)\text{–}S\text{–}CH(COOC_2H_5)\text{–}CH_2\text{–}SC_2H_5$ | 8 | |
| (2) | $C_6H_5\text{–}O\text{–}\underset{OCH_3}{\overset{\overset{O}{\|}}{P}}\text{–}S\text{–}CH_2\text{–}SC_2H_5$ | 53 | |
| (3) | $C_6H_5\text{–}O\text{–}\underset{OC_2H_5}{\overset{\overset{O}{\|}}{P}}\text{–}S\text{–}CH_2\text{–}SC_2H_5$ | 16 | |
| (4) | $C_6H_5\text{–}O\text{–}\underset{OC_2H_5}{\overset{\overset{O}{\|}}{P}}\text{–}S\text{–}CH_2\text{–}CH_2\text{–}SC_2H_5$ | 2 | 25 |
| (5) | $\underset{CH_3}{\overset{C_2H_5O}{\diagdown}}\overset{S}{\underset{\|}{P}}\text{–}S\text{–}CH(COOC_2H_5)\text{–}CH_2\text{–}SC_2H_5$ | | 33 |
| (6) | $\underset{CH_3}{\overset{(CH_3)_3C}{\diagdown}}CH\text{–}O\text{–}\underset{OC_2H_5}{\overset{\overset{O}{\|}}{P}}\text{–}S\text{–}CH_2\text{–}CH_2\text{–}SC_2H_5$ | 25 | |

| | | Fungi | | | | | | | | | | | | |
|---|---|---|---|---|---|---|---|---|---|---|---|---|---|---|
| Active Agent (concentration) | Concentration of active agent, p.p.m. | *Piricularia oryzae* | *Corticium sasakii* | *Cochliobolus miyabeanus* | *Mycosphaerella musicola* | *Cercospora personata* | *Cercospora coffeicola* | *Botrytis cinerea* | *Alternaria tenuis* | *Septoria azaleae* | *Phialophora cinerescens* | *Verticillium albo-atrum* | *Fusarium oxysp. f. cubense* | *Fusarium oxysp. f. dianthi* |
| C₂H₅O–P(S)(–S–CH(COOC₂H₅)–CH₂–S–C₂H₅)–C₆H₅ | 500<br>100 | 0<br>2 | 1<br>2 | 2<br>3 | 0<br>1 | | 2<br>3 | 0<br>0 | 0<br>0 | | 0<br>0 | 0<br>3 | 1<br>3 | 0<br>2 |
| C₆H₅–O–P(O)(OCH₃)–S–CH₂–S C₂H₅ | 500<br>100 | 0<br>0 | 0<br>2 | | 1<br>4 | | | 0<br>0 | 0<br>1 | | 1<br>4 | 0<br>1 | | |
| C₆H₅–O–P(O)(OC₂H₅)–S–CH₂–S C₂H₅ | 500<br>100 | 0<br>0 | 1<br>2 | 2<br>3 | 1<br>4 | | 2<br>4 | | 2<br>4 | | 2<br>4 | 2<br>4 | | |
| C₂H₅O–P(S)(CH₃)–S–CH(COOC₂H₅)–CH₂–S C₂H₅ | 500<br>100 | 0<br>3 | 1<br>1 | | 0<br>1 | | | 0<br>1 | 0<br>1 | | 0<br>0 | 2<br>3 | | 0<br>4 |
| (CH₃)₂C(CH₃)–CH–O–P(O)(OC₂H₅)–S–CH₂–CH₂–S C₂H₅ | 500<br>100 | 0<br>0 | 0<br>2 | | 2<br>4 | | 2<br>3 | 2<br>4 | 1<br>4 | | | | 2<br>4 | 2<br>4 |

It will be appreciated that the instant specification and examples are set forth by way of illustration and not limitation, and that various modifications and changes may be made without departing from the spirit and scope of the present invention.

What is claimed is:

1. Method of combating fungi which comprises applying to the fungi a fungitoxic amount of a thio-phoso acid ester of the formula

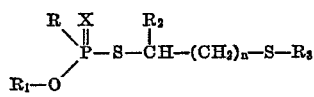

in which R is selected from the group consisting of lower alkyl, lower alkoxy, lower cycloalkoxy, phenyl and naphthyl, R₁ is lower alkyl, R₂ is selected from the group consisting of of hydrogen and lower carboalkoxy, R₃ is lower alkyl, X is selected from the group consisting of oxygen and sulfur, and n is a whole number having a value from 0 to 1.

2. Method according to claim 1 wherein said acid ester is applied in the form of a mixture with a major amount of an inert, finely divided dispersible solid as carrier vehicle.

3. Method according to claim 1 wherein said acid ester is applied in the form of a mixture with a major amount of an inert dispersible liquid as carrier vehicle.

4. Method according to claim 1 wherein said acid ester is applied in the form of a mixture with an inert dispersible carrier vehicle, said acid ester being present in an amount of from about 0.1–95% by weight of the total mixture.

5. Method according to claim 1 wherein said acid ester is applied in the form of a mixture with an inert dispersible carrier vehicle, said ester being present in a concentration of from about 5 to 0.0005% by weight of the total mixture.

6. Method of combating fungi which comprises applying to the fungi a fungitoxic amount of a thio-phospho acid ester of the formula

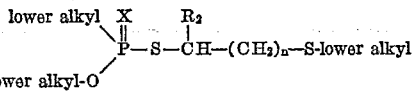

in which R₂ is selected from the group consisting of hydrogen and a lower carboalkoxy, X is selected from the group consisting of oxygen and sulfur, and n is a whole number having a value from 0 to 1.

7. Method of combating fungi which comprises applying to the fungi a fungitoxic amount of a thio-phospho acid ester of the formula

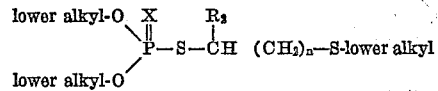

in which R₂ is selected from the group consisting of hydrogen and lower carboalkoxy, X is selected from the group consisting of oxygen and sulfur, and n is a whole number having a value from 0 to 1.

8. Method of combating fungi which comprises applying to the fungi a fungitoxic amount of a thio-phospho acid ester of the formula

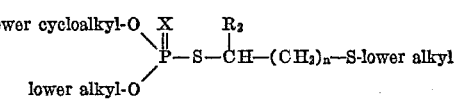

in which R₂ is selected from the group consisting of hydrogen and lower carboalkoxy, X is selected from the group consisting of oxygen and sulfur, and n is a whole number having a value from 0 to 1.

9. Method of combating fungi which comprises applying to the fungi a fungitoxic amount of a thio-phospho acid ester of the formula

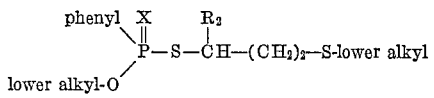

in which $R_2$ is selected from the group consisting of hydrogen and lower carboalkoxy, X is selected from the group consisting of oxygen and sulfur, and $n$ is a whole number having a value from 0 to 1.

10. Method of combating fungi which comprises applying to the fungi a mixture of a dispersible carrier vehicle and a fungitoxic amount of between about 0.1–95% by weight of the mixture of a thiol-phospho acid ester of the formula

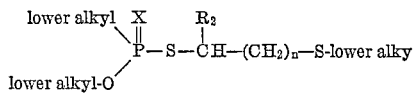

in which $R_2$ is selected from the group consisting of hydrogen and lower carboalkoxy, X is selected from the group consisting of oxygen and sulfur, and $n$ is a whole number having a value from 0 to 1.

11. Method of combating fungi which comprises applying to the fungi a mixture of a dispersible carier vehicle and a fungitoxic amount of between about 0.1–95% by weight of the mixture of a thiol-phospho acid ester of the formula

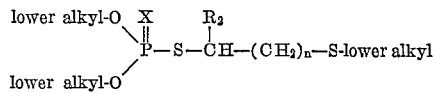

in which $R_2$ is selected from the group consisting of hydrogen and lower carboalkoxy, X is selected from the group consisting of oxygen and sulfur, and $n$ is a whole number having a value from 0 to 1.

12. Method of combating fungi which comprises applying to the fungi a mixture of a dispersible carrier vehicle and a fungitoxic amount of between about 0.1–95% by weight of the mixture of a thiol-phospho acid ester of the formula

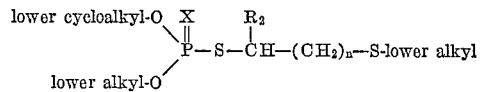

in which $R_2$ is selected from the group consisting of hydrogen and lower carboalkoxy, X is selected from the group consisting of oxygen and sulfur, and $n$ is a whole number having a value from 0 to 1.

13. Method of combating fungi which compries applying to the fungi a mixture of a dispersible carrier vehicle and a fungitoxic amount of between about 0.1–95% by weight of the mixture of a thiol-phospho acid ester of the formula

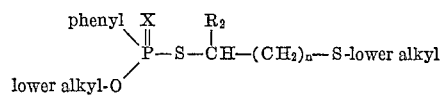

in which $R_2$ is selected from the group consisting of hydrogen and lower carboalkoxy, X is selected from the group consisting of oxygen and sulfur, and $n$ is a whole number having a value from 0 to 1.

14. Method of combating fungi which comprises applying to the fungi a mixture of an inert dispersible carrier vehicle and a fungitoxic amount of between about 0.1–95% by weight of the mixture of a thionothiol phosphonic acid ester of the formula

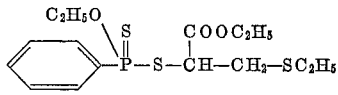

15. Method of combating fungi which comprises applying to the fungi a mixture of an inert dispersible carrier vehicle and a fungitoxic amount of between about 0.1–95% by weight of the mixture of a thiol phosphoric acid ester of the formula

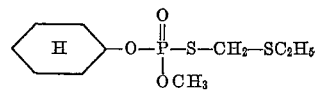

16. Method of combating fungi which comprises applying to the fungi a mixture of an inert dispersible carrier vehicle and a fungitoxic amount of between about 0.1–95% by weight of the mixture of a thiol phosphoric acid ester of the formula

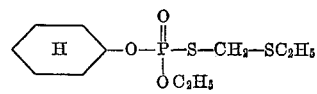

17. Method of combating fungi which comprises applying to the fungi a mixture of an inert dispersible carrier vehicle and a fungitoxic amount of between about 0.1–95% by weight of the mixture of a thiol phosphoric acid ester of the formula

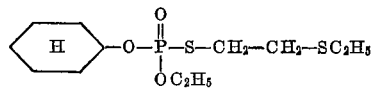

18. Method of combating fungi which comprises applying to the fungi a mixture of an inert dispersible carrier vehicle and a fungitoxic amount of between about 0.1–95% by weight of the mixture of a thionothiol phosphoric acid ester of the formula

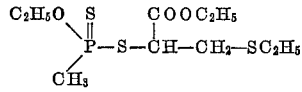

19. Method of combating fungi which comprises applying to the fungi a mixture of an inert dispersible carrier vehicle and a fungitoxic amount of between about 0.1–95% by weight of the mixture of a thiol phosphoric acid ester of the formula

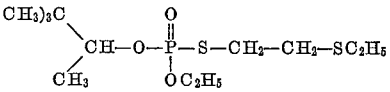

References Cited

UNITED STATES PATENTS

| | | |
|---|---|---|
| 2,596,076 | 5/1952 | Hook. |
| 2,759,010 | 8/1956 | Lorenz. |
| 2,815,312 | 12/1957 | Schuler. |
| 3,004,980 | 10/1961 | Schrader. |
| 3,089,807 | 5/1963 | Trademan. |

FOREIGN PATENTS

| | | |
|---|---|---|
| 1,116,657 | 11/1961 | Germany. |

OTHER REFERENCES

Chemical Abstracts, 63, p. 18,966g.

ALBERT T. MEYERS, Primary Examiner

V. D. TURNER, Assistant Examiner

U.S. Cl. X.R.

260—948

PO-1050
(5/69)

UNITED STATES PATENT OFFICE
CERTIFICATE OF CORRECTION

Patent No. 3,459,857      Dated August 5, 1969

Inventor(s) Hans Scheinpflug, Herbert Ferdinand Jung and Gerhard Schrader

It is certified that error appears in the above-identified patent and that said Letters Patent are hereby corrected as shown below:

Column 3, lines 43-44, "Basidomycetes" should be --Basidiomycetes--. Column 4, line 9, "anmals" should be --animals--. Column 4, line, 25 "where" should be --whereas--. Column 6, line 1, "cyclooctoyloxy" should be --cyclooctyloxy--. Column 6, line 15, "carboalkyoxy" should be --carboalkoxy--. Column 8, Table 1, compound No. (1), left side of the structural formula "$C_2H_2O$" should be --$C_2H_5O$--. Column 12, Table 3, under the general heading "Fungi", the sixth column heading "Cercospora voffeicola" should be --Cercospora coffeicola--. Column 11, line 47, "thio-phoso" should be --thio-phospho--. Column 11, line 62, delete one "of"

SIGNED AND
SEALED
MAY 5 1970

(SEAL)
Attest:

Edward M. Fletcher, Jr.
Attesting Officer

WILLIAM E. SCHUYLER, JR.
Commissioner of Patents